(12) United States Patent
Phatak et al.

(10) Patent No.: US 9,022,111 B2
(45) Date of Patent: May 5, 2015

(54) METHOD OF WELL TREATMENT USING SYNTHETIC POLYMERS

(75) Inventors: Alhad Phatak, Houston, TX (US); Carlos Abad, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 445 days.

(21) Appl. No.: 13/103,385

(22) Filed: May 9, 2011

(65) Prior Publication Data

US 2012/0285688 A1 Nov. 15, 2012

(51) Int. Cl.
| | |
|---|---|
| E21B 43/22 | (2006.01) |
| E21B 43/04 | (2006.01) |
| E21B 43/26 | (2006.01) |
| C09K 8/508 | (2006.01) |
| C09K 8/68 | (2006.01) |
| C09K 8/90 | (2006.01) |

(52) U.S. Cl.
CPC . *C09K 8/508* (2013.01); *C09K 8/68* (2013.01); *C09K 8/905* (2013.01); *C09K 2208/30* (2013.01)

(58) Field of Classification Search
None
See application file for complete search history.

(56) References Cited

U.S. PATENT DOCUMENTS

| | | | |
|---|---|---|---|
| 6,257,335 B1 | 7/2001 | Nguyen et al. | |
| 7,256,242 B2 | 8/2007 | Nelson | |
| 2006/0076138 A1 | 4/2006 | Dusterhoft et al. | |
| 2008/0004188 A1 | 1/2008 | Heidlas et al. | |
| 2009/0105097 A1* | 4/2009 | Abad et al. | 507/241 |
| 2010/0175880 A1 | 7/2010 | Wang et al. | |
| 2010/0270022 A1 | 10/2010 | Crews | |
| 2011/0048716 A1 | 3/2011 | Ezell | |
| 2011/0048718 A1 | 3/2011 | Van Zanten et al. | |

FOREIGN PATENT DOCUMENTS

| | | |
|---|---|---|
| WO | 02070861 A1 | 9/2002 |
| WO | 2008068467 A1 | 6/2008 |
| WO | 2013040167 A1 | 3/2013 |

OTHER PUBLICATIONS

International Search Report and Written Opinion issued in PCT/US2012/036274 on Nov. 30, 2012, 12 pages.
Search Report issued in EP12782617.0 on Sep. 11, 2014, 5 pages.

* cited by examiner

*Primary Examiner* — Zakiya W Bates
(74) *Attorney, Agent, or Firm* — Jeremy D. Tillman; Rachel E. Greene; Tim Curington

(57) ABSTRACT

A method for treating a subterranean formation, including estimating the solubility parameter of a monomer; selecting a solvent based on the parameter; forming a fluid comprising the monomer and solvent; and introducing the fluid to the formation, wherein the formation is about 350° F. or warmer. A method for treating a subterranean formation, including forming a fluid comprising the monomer and solvent, wherein the monomer comprises poly(2-hydroxyethyl methacrylate) and/or poly(2-hydroxyethyl acrylate, and wherein the solvent comprises zinc bromide or calcium bromide or both; and introducing the fluid to the formation, wherein the formation is about 350° F. or warmer.

23 Claims, 3 Drawing Sheets

METHOD OF WELL TREATMENT USING SYNTHETIC POLYMERS

TECHNICAL FIELD

This invention relates to treating subterranean formations under certain conditions. More particularly, it relates to using monomers and polymers, particularly in the treatment of subterranean formations.

BACKGROUND

In recent years, an increasing number of wells are being drilled to depths that result in bottomhole static temperatures (BHST) in excess of 400° F. In order to increase the productivity of these wells to enable economic production of hydrocarbons, well stimulation operations may be necessary. A commonly employed stimulation technique is hydraulic fracturing, wherein fracturing fluids are pumped into the formation at high pressure to crack the formation and create fractures, and subsequently deposit large quantities of sand or synthetic ceramic material (termed 'proppant') into these fractures to keep them open. The hydraulically created fractures serve as high conductivity pathways for oil and gas to flow to the well bore at high rates. Fracturing fluids often possess high viscosities to enable cracking the formation at relatively low pumping rates, and to enable efficient transport of proppant from the surface to the fracture. The most commonly employed high viscosity fluids are obtained by mixing 'viscosifiers' with water. These viscosifiers are typically natural polymers such as guar (and its derivatives), cellulose derivatives, xanthan, diutan, etc. Polymer-free viscosifiers such as viscoelastic surfactants (VES) are also commonly utilized. The performance of all these viscosifiers is limited in most cases to wells having bottomhole temperatures of 300° F., and in some cases, temperatures up to 350° F. Synthetic polymers and copolymers of acrylamide, methacrylamide or 2-Acrylamido-2-methylpropane sulfonic acid, AMPS, such as polyacrylamide, partially hydrolyzed polyacrylamide and its copolymers and derivatives have been used to provide high viscosity aqueous fluids that are stable above 400° F. However, these fluids are known to be very sensitive to even small amounts (a few percent by weight) of dissolved salts.

In a number of cases, these high temperature reservoirs are composed of sandstone that may not be consolidated. In unconsolidated formations, there is a tangible risk of sand particles coming loose during production and flowing into the wellbore along with the produced fluid. These sand particles can cause erosion to production as well as surface equipment such as tubing, chokes, valves, etc. Produced sand can also bridge off the tubing, shutting down production. These events result in very high costs associated with clean out and disposal of sand, and workover to bring the well back on production. As a result, sand control techniques are employed when producing from unconsolidated or weakly consolidated formations. The simplest sand control completion is a "stand alone screen", wherein a screen is installed on the outside of the production tubing to filter out the sand before it can be produced. Another sand control technique is placing a "gravel pack", wherein strategically sized gravel particles are placed in the near wellbore region, outside the screen. In this scenario, the completion has two filters against sand production—the gravel pack and the screen. The gravel pack can be placed in the producing zone by pumping gravel with water or brine at high rates, and using the velocity of the fluid to transport gravel. Alternately, viscous fluids can be used to suspend and transport gravel at relatively low rates. The commonly used viscosifiers in gravel packing operations include hydroxyethylcellulose (HEC), xanthan gum, and viscoelastic surfactants (VES). As in the case of hydraulic fracturing fluids, the upper temperature limit of these biopolymer and VES fluids is usually around 300° F. or so, and in some cases, around 350° F. or so.

Additionally, another sand control technique is placing a "frac and pack", wherein strategically sized gravel particles are placed in the near wellbore region, outside the screen, after a short hydraulic fracture has been created in the formation. In this scenario, the completion has three filters against sand production—the propped fracture, the gravel pack and the screen. The frac and pack is typically placed in the producing zone by pumping gravel with viscous fluids used to suspend and transport gravel at relatively low rates. The commonly used viscosifiers in gravel packing operations include Guar gum and its derivatives, and viscoelastic surfactants (VES). As in the case of hydraulic fracturing fluids, the upper temperature limit of these biopolymer and VES fluids is usually around 300° F. or so, and in some cases, around 350° F. or so.

FIGURES

SUMMARY

Figure 1:
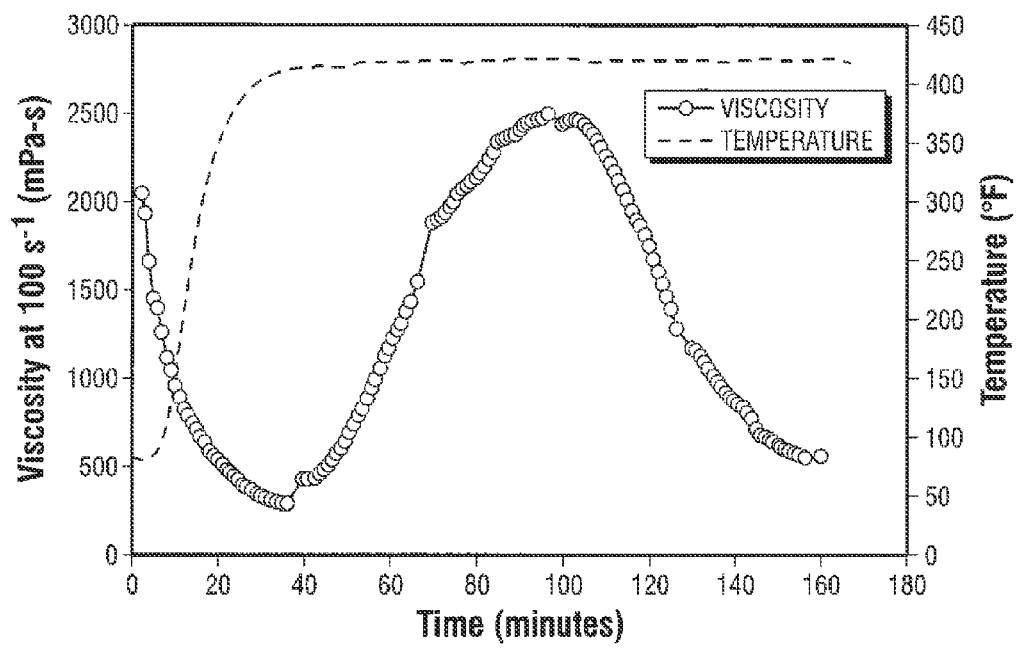
FIG. 1 is a plot of viscosity of a poly(HEMA)-$ZnBr_2$/$CaBr_2$ gel at 425° F.

Embodiments of the invention relate to a method for treating a subterranean formation, including estimating cohesion parameters, such as solubility parameters of a solvent; selecting a polymer based on the parameter; forming a fluid comprising the polymer and solvent; and introducing the fluid to the formation, wherein the formation is about 350° F. or warmer. Embodiments of the invention relate to a method for treating a subterranean formation, including forming a fluid comprising a polymer precursor and a solvent, wherein the polymer precursor comprises poly(2-hydroxyethyl methacrylate) and/or poly(2-hydroxyethyl acrylate), and wherein the solvent comprises zinc bromide or calcium bromide or both; and introducing the fluid to the formation, wherein the formation is about 350° F. or warmer. Embodiments of the invention relate to a method for treating a subterranean formation, including forming a fluid comprising a polymer precursor and a solvent, wherein the polymer precursor comprises monomer such as 2-hydroxyethyl methacrylate and/or 2-hydroxyethyl acrylate, and wherein the solvent comprises zinc bromide or calcium bromide or both; allowing the polymer precursors to polymerize to obtain a polymer and introducing the fluid to the formation, wherein the formation is about 350° F. or warmer.

DETAILED DESCRIPTION

It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventor(s) appreciate and understand that any and all data points within the range are to be considered to have been specified, and that the inventor(s) have possession of the entire range and all points within the range.

As briefly described above, it is desirable to have materials that can increase the viscosity of (viscosify) water and salt solutions at temperatures higher than 350° F. and in some cases, up to temperatures higher than 400° F.

Some high temperature wells are in formations that also display high pore pressure gradients. This necessitates the use of high density fluids to overcome the pore pressure gradient during pumping, in order to prevent the well from flowing (techniques used to do this are typically termed "well control"). In addition, high density fluids provide the ability to generate an equivalent bottomhole pressure as with a low density fluid, but at a lower pumping rate or a lower surface treating pressure. High density brines, obtained by dissolving various salts in water, can be used to provide well control during drilling, completions and well treatment operations. Some examples of such salts are potassium chloride, sodium chloride, sodium bromide, calcium chloride, calcium bromide, zinc bromide, cesium formate, and potassium formate. The maximum brine density that can be achieved with a particular salt is determined by the solubility of the salt in water. In order to reach densities higher than 15 lbm/gal, the two most commonly employed brines are zinc bromide and cesium formate. Since cesium formate brines are very expensive, it is desirable to be able to formulate treatment fluids in zinc bromide containing brines, which are relatively cheaper. It is therefore desirable to have the ability to viscosify zinc bromide containing brines at temperatures above 400° F.

Embodiments of the invention provide a method to prepare well treatment fluids using high density brines and synthetic polymers. These polymers may be synthesized in the brine itself, or may be separately added to the brine as thickeners. In more specific cases, the polymers may be synthesized by mixing free radical initiators and monomers that are soluble in the brine and setting off the polymerization reaction at a desired temperature. The polymerization reaction may be performed prior to treatment in a batch process or may be performed at a location downhole, either in the workstring, or in the formation. The polymerization reaction is triggered at a temperature that is determined by the initiator chosen. In addition to the polymerization reaction, the gels formed in the following examples show surprising increase in viscosity when exposed to temperatures in excess of 400° F., without the addition of a crosslinker as compared to that obtained by mere monomer polymerization. This feature of crosslinkerless viscosity increase is especially useful for downhole applications such as fracturing, gravel packing and frac and pack as it allows for higher viscosities to be obtained and thus reduced polymer concentrations can be used to achieve the desired transport properties. In addition, the delaying of viscosity increase till the fluid reaches 400° F. results in the fluid having a relatively low viscosity at surface and in the tubulars, enabling the transport of the fluid using relatively low pressures.

"Polymer dissolving solvents" or "dissolving solvents" are those solvents used for dissolving the polymeric precursors. The polymer dissolving solvent may be any solvent that is capable of fully dissolving the polymeric precursor molecules into a solution. Examples of polymer dissolving solvents are $ZnBr_2$, $CaBr_2$ and mixed $ZnBr_2/CaBr_2$ brines also referred to as divalent bromide brines.

Choice of Initiator

When a polymerization of the "polymer precursor" is required to obtain a polymer soluble in the divalent bromide solvents the free radical initiator can be chosen depending on the temperature at which the polymerization reaction is desired. Some commonly used free radical initiators are peroxides (benzoyl peroxide, hydrogen peroxide, t-butyl peroxide, methylethylketone peroxide), hydroperoxides (t-butyl hydroperoxide), and azo compounds (2,2'-azobisisobutyronitrile, 1,1'-Azobis(cyclohexanecarbonitrile), 2,2'-azobis(2-aminopropane) dihydrochloride), 2,2'-Azobis {2-methyl-N-[1,1-bis(hydroxymethyl)-2-hydroxyethl]propionamide}, 2,2'-Azobis[2-methyl-N-(2-hydroxyethyl)propionamide], 2,2'-Azobis(1-imino-1-pyrrolidino-2-ethylpropane)dihydrochloride, 2,2'-Azobis[2-(2-imidazolin-2-yl)propane], 2,2'-Azobis {2-[1-(2-hydroxyethyl)-2-imidazolin-2-yl]propane} dihydrochloride, 2,2'-Azobis [N-(2-carboxyethyl)-2-methylpropionamidine]hydrate, 2,2'-Azobis[2-(2-imidazolin-2-yl) propane]disulfate dihydrate, 2,2'-Azobis[2-(2-imidazolin-2-yl)propane]dihydrochloride.

Choice of Monomer

The monomer can be chosen from a large group comprising methacrylic acid and methacrylate derivatives, acrylic acid and acrylate derivatives, acrylonitrile, acrylamide and acrylamide derivatives, vinyl pyridine, vinyl pyrrolidone, etc. Other typical examples of monomers soluble in the heavy brine of choice are aminated acrylates and methacrylates such as Dimethylaminoethyl Methacrylate (DMAEMA), hydroxy containing acrylates and methacrylates such as glycol or monosaccharide acrylate, acrylamido-2-methylpropane sulfonic acid or AMPS, or diallyldimethylammonium chloride (DADMAC). The limitation on the choice of monomers is that the monomers and the resulting polymer need to be soluble in the brine of interest. Additionally, multiple monomers can be used in the same treatment, resulting in co-polymers, whose architecture can be controlled by the relative reactivities of individual monomers. Random, graft, and block copolymers can be generated by this process. The molecular weight of the polymerization product can be controlled by varying the ratio of initiator and monomer using well known techniques. Specific initiators, chain transfer agents and comonomers enabling the various co polymer structures listed herein known to those of skill in the art of free radical polymerization can be used, so as to fit the performance needs of the polymer brine solution.

Poly(2-hydroxyethylmethacrylate), poly(2-HEMA), is soluble in $ZnBr_2$, $CaBr_2$ and mixed $ZnBr_2/CaBr_2$ brines, herein called "divalent bromide solvents" while it is insoluble in fresh water as well as brines that contain salts like sodium bromide, potassium chloride, calcium chloride, and cesium formate. This counter-intuitive result may be rationalized on the basis of the concept of solubility parameters. U.S. Pat. No. 7,256,242 reports Hansen solubility parameters (dispersive, $\delta_D$, polar, $\delta_P$, and hydrogen bonding, $\delta_H$ components) of various solvents and poly(2-HEMA) having various molecular weights. The values reported suggest that due to its strong hydrogen bonding tendency, water is not a good solvent for poly(2-HEMA). Addition of $CaBr_2$ and $ZnBr2$ salt likely shifts the solubility parameters towards those of poly(2-HEMA). The concept of solubility parameters provides a framework for selecting monomers that can be reacted to form polymers that are soluble in the brines of interest.

Solutions of poly(2-hydroxyethyl methacrylate) and poly (2-hydroxyethyl acrylate) in zinc bromide and calcium bromide brines surprisingly displayed viscosity enhancement when they were heated, and the resulting gels had stable viscosities at temperatures well in excess of 400° F. This viscosification was shown in addition to the viscosity enhancement over the solvent viscosity derived from polymer disolution, or monomer polymerization reaction performed prior to heating the gels to temperatures in excess of 400° F. This property of the gels obviates the need to add a crosslinker to the formulation. The need to add crosslinkers can make the fluid more expensive and/or complicated for field operations. In addition, it may present the possibility of side reactions that can undermine the performance of the fluid.

Other suitable polymers can be specifically found for each polymer dissolving solvent. The selection of appropriate polymer and solvent pairs can be purely empirical or can be achieved by some simple rules such as those provided by the well known Hildebrand and or Hansen Solubility Parameter schemes. Values of the different solubility parameters for polymers and solvents of interest can be found in multiple sources in the literature; of particular use are Hansen Solubility Parameters, a user Handbook, Charles Hansen, CRC Press, 2000.

The term polymer precursor comprises a polymerizeable monomer, a vinyl monomer, a mixture of polymerizeable monomers, a pre-polymer, or a polymer. Embodiments of the invention include using free radical initiators to perform polymerization reactions. It is understood that several fundamental properties of polymers and solvents can described by the generic term cohesion parameter, or parameter as used in the disclosure. As listed by Barton, (CRC, Handbook of Polymer-Liquid Interaction Parameters and solubility parameters, Allan F. M. Barton, CRC Press, Florida, 1990), one fundamental cohesion parameter is the Hildebrand Solubility Parameter.

The most successful solubility parameter scheme to describe the various types of interactions resulting in the fundamental cohesion parameters is the one proposed by Hansen, (CRC Press, Hansen Solubility Parameters, a User's Handbook, Charles M. Hansen, Second Edition, Florida, 2000) the three parameter Hansen Solubility Parameter scheme comprising a polar parameter, a dispersive parameter and a hydrogen bonding parameter. In general the discussion on this disclosure will focus on the Hildebrand and primarily on the Hansen solubility parameters, but other parameters are also of potential use.

As a reference, by Barton (CRC, Handbook of Solubility Parameters and Other Cohesion Parameters, Allan F. M. Barton, CRC Press, Florida, 1990) is a good review of the different other solubility and cohesion schemes for use. Amongst these, other authors have proposed the expansion of the cohesion parameter into various elements describing aspects of the intermolecular interaction. Fundamental studies such as the 5 parameter scheme proposed by Karger, Keller, Snyder and Eon including a dispersion, a induction, an orientation, and acid and a base interaction parameters can be used. Two parameter schemes such as the one proposed by Van Arkel, Small, and Prausnitz including a polar and a non polar parameter are also of potential use in the disclosure. Other three solubility parameter schemes and or different means of calculating solubility parameters are those of Null and Palmer, the model by Wiehe and Bagley, Hoy's model, Crowley, Teague and Lowe's model or Martin, Wu and Beerbower's model. There are other solubility scales as well. Product literature for polymers and solvents and technical reports present a bewildering assortment of such systems: Kaouri-Butanol number, solubility grade, aromatic character, aniline cloud point, wax number, heptane number, among others. Sometimes only numerical values for these terms are encountered, while at other times values are presented in the form of two or three dimensional graphs, and a triangular graph called a Teas graph has found increasing use because of its accuracy and clarity. Other related value that also can be considered within the generic term "parameter" as used in the disclosure is the cohesive energy density.

Following the "Hildebrand Solubility Parameter" scheme, by matching the solvent Hildebrand solubility parameter ($\delta^S$) to the polymer Hildebrand solubility parameter ($\delta^P$), suitable polymer dissolving solvents for the polymer precursor can be found. In practice, matching Hildebrand solubility parameters $\delta^S$ and $\delta^P$ means calculating the absolute difference of Hildebrand solubility parameter of the solvent with respect to the polymer (absolute value of $\delta^S$-$\delta^P$). Solvents whose "absolute difference of Hildebrand solubility parameter" with the polymer is less than 5 $MPa^{1/2}$ may provide a suitable polymer dissolving solvent for a given polymer precursor. Solvents whose absolute difference of Hildebrand solubility parameter with the polymer is less than 3 $MPa^{1/2}$ are appropriate polymer dissolving solvents for a given polymer precursor. Solvents whose absolute difference of Hildebrand solubility parameter with the polymer is less than 1 $MPa^{1/2}$ may be particularly well suited as polymer dissolving solvents for a given polymer precursor.

The Hansen solubility parameter scheme provides a more elaborate polymer selection method, which compares three different components of the solvent and polymer. The solvent Hansen polar solubility parameter ($\delta_P^S$), the solvent Hansen hydrogen bonding solubility parameter ($\delta_H^S$) and the solvent Hansen dispersive solubility parameter ($\delta_D^S$) are compared to the polymer Hansen polar solubility parameter ($\delta_P^P$), the polymer Hansen hydrogen bonding solubility parameter ($\delta_H^P$) and the polymer Hansen dispersive solubility parameter($\delta_D^P$), respectively. In addition, a "solubility distance" Ra, is compared to a "solubility sphere radius", Ro, which is a property of the polymer. The "solubility distance" Ra is calculated as the square root of a certain linear combination of the squared differences of the three parameters between the solvent and polymer as:

$$Ra=[(\delta_P^S-\delta_P^P)^2+(\delta_H^S-\delta_H^P)^2+4\,(\delta_D^S-\delta_D^P)^2]^{(1/2)} \quad (3)$$

The "solubility sphere radius", Ro defines the radius of a boundary sphere in the three dimensional Hansen Solubility Parameter space which separates good and bad solvents for the polymer of choice. Values of $\delta_P^P$, $\delta_H^P$, $\delta_D^P$, and Ro are known for the majority of the commercial polymers and are often available from the polymer suppliers or can be found in literature. Values of $\delta_P^S$, $\delta_H^S$, $\delta_D^S$, are known for a huge selection of solvents; of particular use are those values found in "Hansen Solubility Parameters, a user Handbook", Charles Hansen, CRC Press, 2000. For those solvents (or polymers) for which the $\delta_P^S$, $\delta_H^S$, $\delta_D^S$ values are not available, good estimates can be obtained using group contribution methods, or from polymer in solvent experimental solubility determinations.

In practice, matching of Hansen solubility parameters means calculating the three absolute differences of the solvent solubility parameter with respect to the polymer for each of the three components. The three are (1) the absolute difference of the Hansen polar solubility parameter (absolute value of $\delta_P^S-\delta_P^P$); (2) the absolute difference of the Hansen hydrogen bonding solubility parameter (absolute value of $\delta_H^S-\delta_H^P$); and (3) the absolute difference of the Hansen dispersive solubility parameter (absolute value of $4\times[\delta_D^S-\delta_D^P]$). It should be noted that for the last definition a multiplying factor of 4 is commonly used. Solvents where the (absolute value of $\delta_P^S-\delta_P^P$) is less than 5 MPa$^{1/2}$ and where (absolute value of $\delta_H^S-\delta_H^P$) is less than 5 MPa$^{1/2}$ and where (absolute value of $4\times[\delta_D^S-\delta_D^P]$) is less than 5 MPa$^{1/2}$ may be suitable polymer dissolving solvents for a given polymeric precursor. Solvents where the (absolute value of $\delta_P^S-\delta_P^P$) is less than 3 MPa$^{1/2}$ and where (absolute value of $\delta_H^S-\delta_H^P$) is less than 3 MPa$^{1/2}$ and where (absolute value of $4\times[\delta_D^S-\delta_D^P]$) is less than 3 MPa$^{1/2}$ may be particularly suitable polymer dissolving solvent for a given polymer precursor. Solvents where the (absolute value of $\delta_P^S-\delta_P^P$) is less than 1 MPa$^{1/2}$ and where the (absolute value of $\delta_H^S-\delta_H^P$) is less than 1 MPa$^{1/2}$ and where the (absolute value of $4\times[\delta_D^S-\delta_D^P]$) is less than 1 MPa$^{1/2}$ may be still more particularly suited as the polymer dissolving solvent for a given polymer precursor.

The suitability of a solvent to become a polymer dissolving solvent for a particular polymer precursor can also be ascertained by calculating the "solubility distance", Ra, between solvent and polymer as described earlier. This is matched to the "solubility sphere radius", Ro of the polymer as found in literature. In practice, solvents whose "solubility distance", Ra with respect to a given polymer precursor is not higher than 1.1 times, more particularly 0.8 times, and still more particularly 0.5 times, the "solubility sphere radius", Ro of the polymer may be suitable as the polymer dissolving solvent for the polymer precursor.

Figure 6:
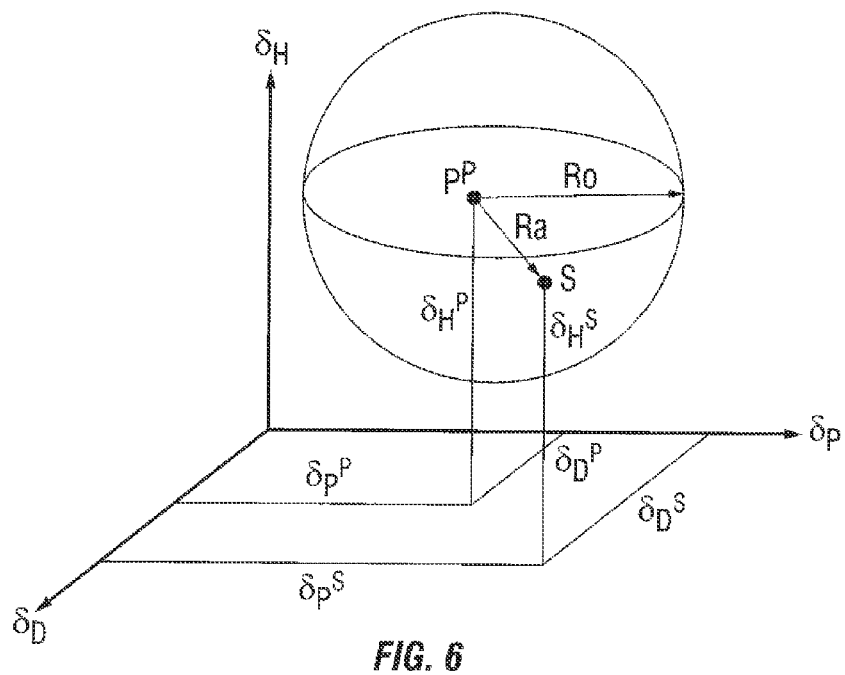
FIG. 6 is a plot of a polymer P with solubility parameters $[\delta_P^P, \delta_H^P, \delta_D^P]$.

FIG. 6 is an example of how a polymer P with solubility parameters [$\delta_P^P$, $\delta_H^P$, $\delta_D^P$] can be selected as soluble polymer in a solvent S with solubility parameters [$\delta_P^S$, $\delta_H^S$, $\delta_D^S$] since the distance Ra in the three dimensional space, is smaller than the "solubility sphere radius" for the polymer, Ro.

Examples of polymers that can be used as part of the invention are amongst those whose Hildebrand solubility parameter $\delta^P$ is higher than 15 and lower than 35, and more preferably higher than 19 and lower than 29.

Examples of polymers that can be used as part of the invention are amongst those whose Hansen hydrogen bonding solubility parameter $\delta_H^P$ is higher than 12 and lower than 35, and more preferably higher than 14 and lower than 25.

Examples of polymers that can be used as part of the invention are amongst those whose Hansen hydrogen bonding solubility parameter $\delta_H^P$ is higher than 12 and lower than 35, and more preferably higher than 14 and lower than 25, and whose Hansen polar bonding solubility parameter $\delta_P^P$ is higher than 8 and lower than 22, and more preferably higher than 12 and lower than 20.

Examples of polymers that can be used as part of the invention are amongst those whose Hansen hydrogen bonding solubility parameter $\delta_H^P$ is higher than 12 and lower than 35, and more preferably higher than 14 and lower than 25, whose Hansen polar solubility parameter $\delta_P^P$ is higher than 8 and lower than 22, and more preferably higher than 12 and lower than 20, and whose Hansen dispersive solubility parameter $\delta_D^P$ is higher than 8 and lower than 22, and more preferably higher than 12 and lower than 20.

In some embodiments, the polymer precursor comprises polymers whose Hildebrand solubility parameter $\delta^P$ is higher than 22 and lower than 42, and more preferably higher than 27 and lower than 37. In some embodiments, the polymer precursor comprises polymers whose Hansen hydrogen bonding solubility parameter $\delta_H^P$ is higher than 22 and lower than 42, and more preferably higher than 27 and lower than 37. In some embodiments, the polymer precursor comprises polymers whose Hansen hydrogen bonding solubility parameter $\delta_H^P$ is higher than 22 and lower than 42, and more preferably higher than 27 and lower than 37, and whose Hansen polar bonding solubility parameter $\delta_P^P$ is higher than 8 and lower than 22, and more preferably higher than 10 and lower than 18. In some embodiments, the polymer precursor comprises polymers whose Hansen hydrogen bonding solubility parameter $\delta_H^P$ is higher than 22 and lower than 42, and more preferably higher than 27 and lower than 37, whose Hansen polar solubility parameter $\delta_P^P$ is higher than 8 and lower than 22, and more preferably higher than 10 and lower than 18, and whose Hansen dispersive solubility parameter $\delta_D^P$ is higher than 8 and lower than 22, and more preferably higher than 10 and lower than 18.

EXAMPLES

Example 1

5 g of 2-hydroxyethylmethacrylate (HEMA) (Sigma-Aldrich) and 0.1 g of 2,2-azobis(2-aminopropane) dihydrochloride (Sigma-Aldrich) dissolved in 2 ml of de-ionized water were mixed with 100 ml of 16 ppg $ZnBr_2/CaBr_2$ brine (obtained by diluting 19.2 ppg $ZnBr_2/CaBr_2$ brine from M-ISwaco with de-ionized water). The mixture was placed in an oven at 150° F. for 24 hours, following which it was loaded on to a Grace M5600 rheometer and the viscosity of the fluid was measured at 100 s$^{-1}$ and 425° F. FIG. 1 shows that the viscosity of the fluid initially went down upon heating, but increased sharply after about 40 minutes of measurement. The viscosity remained high for the duration of the test.

Example 2

Figure 2:
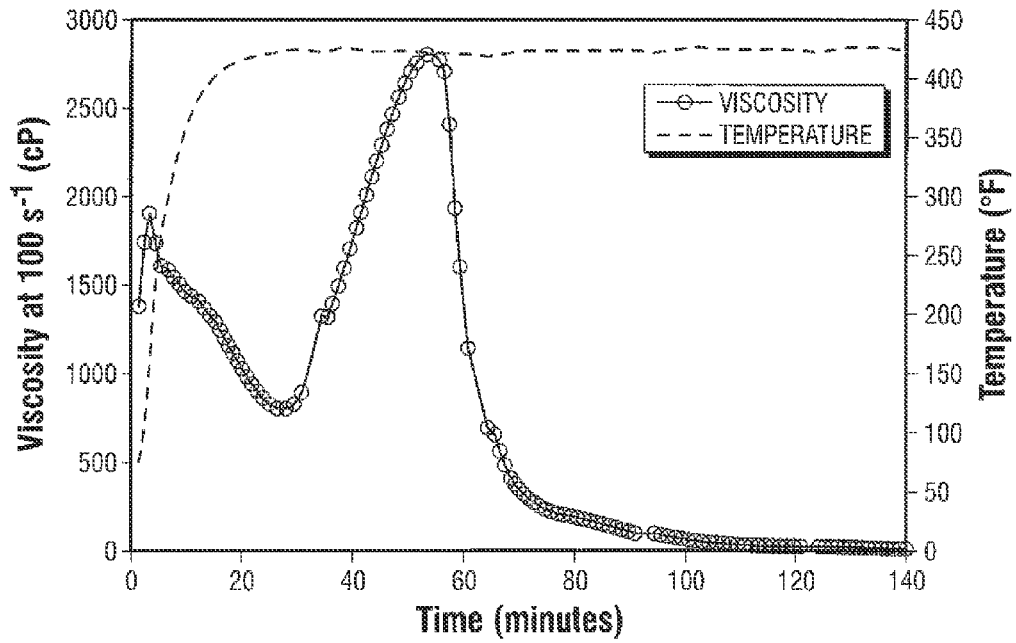
FIG. 2 is a plot of viscosity of a poly(HEMA)-$ZnBr_2$/$CaBr_2$ gel at 425° F.

5 g of 2-hydroxyethylmethacrylate (HEMA) (Sigma-Aldrich) and 0.01 g of 2,2'-Azobis[2-methyl-N-(2-hydroxyethyl) propionamide] (Wako Chemicals) dissolved in 2 ml of de-ionized water were mixed with 100 ml of 16 ppg $ZnBr_2/CaBr_2$ brine (obtained by diluting 19.2 ppg $ZnBr_2/CaBr_2$ brine from MI-Swaco with de-ionized water). The mixture was placed in an oven at 200° F. for 48 hours, following which it was loaded on to a Grace M5600 rheometer and the viscosity of the fluid was measured at 100 s$^{-1}$ and 425° F. FIG. 2 shows that the viscosity of the fluid initially went down upon heating, but increased sharply after about 30 minutes of measurement. The viscosity remained high for the duration of the test.

Example 3

Figure 3:
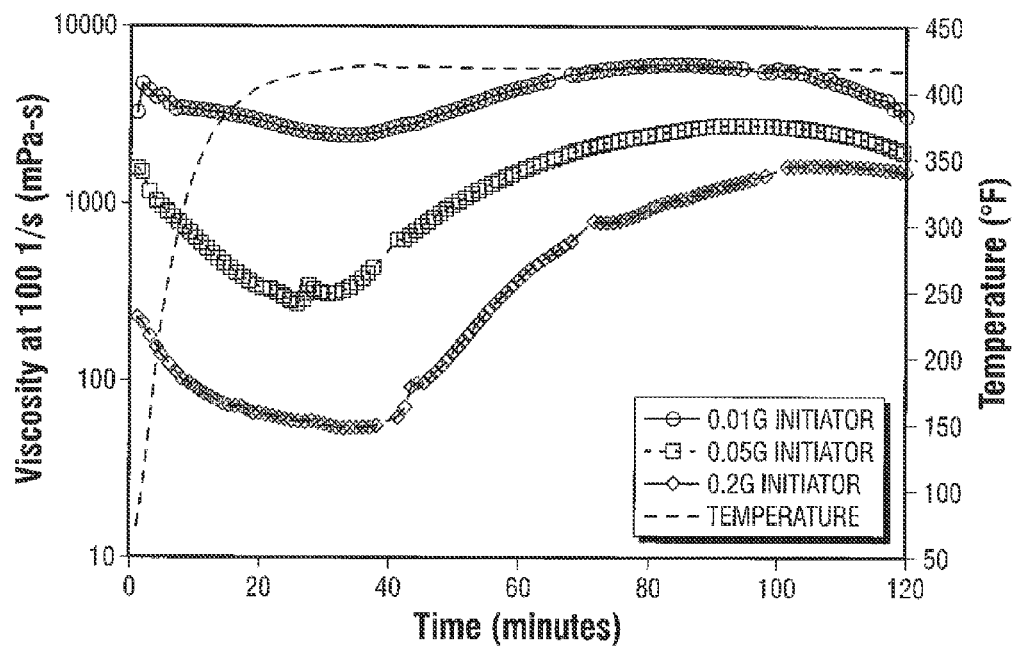
FIG. 3 is a plot of viscosities of several poly(HEMA)-$ZnBr_2$/$CaBr_2$ fluids at 425° F., using three different initiator amounts.

High Temperature Viscosity of Poly (HEMA)-$ZnBr_2/CaBr_2$ gel-Effect of Initiator Concentration 5 g of 2-hydroxyethylmethacrylate (HEMA) (Sigma-Aldrich) and three different amounts of 2,2-azobis(2-aminopropane) dihydrochloride (Sigma-Aldrich) (0.01, 0.05 and 0.2 g) dissolved in 2 ml of de-ionized water were mixed with 100 ml of 16 ppg $ZnBr_2/CaBr_2$ brine (obtained by diluting 19.2 ppg $ZnBr_2/CaBr_2$ brine from MI-Swaco with de-ionized water). The mixtures were placed in an oven at 150° F. for 72 hours, following which they were loaded on to Grace M5600 rheometers and the viscosities of the fluids were measured at 100 s$^{-1}$ and 425° F. FIG. 3 shows that for a fixed polymer concentration, the viscosity of these fluids can be controlled by varying the amount of initiator used in the polymerization. Lower initiator concentrations result in higher molecular weights, which result in higher gel viscosities. The polymer concentration required to achieve a certain gel viscosity can be substantially lowered by lowering the initiator concentration. Of course, it will be apparent to a person skilled in the art that this trend cannot be extended indefinitely, and that there is a certain minimum concentration of initiator below which no polymerization occurs.

Example 4

Figure 4:
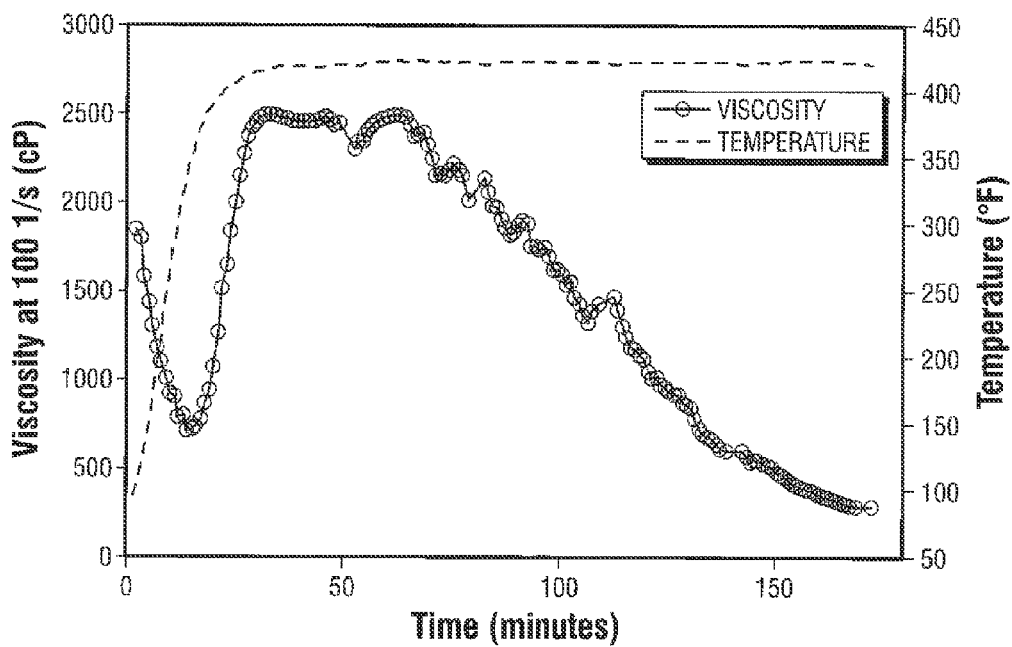
FIG. 4 is a plot of viscosity of a poly(HEA)-$ZnBr_2$/$CaBr_2$ gel at 425° F.

High Temperature Viscosity of Poly (HEA)-ZnBr$_2$/CaBr$_2$ gel 7 g of 2-hydroxyethylmethacrylate (HEA) (Sigma-Aldrich) and 0.1 g of 2,2-azobis(2-aminopropane) dihydrochloride (Sigma-Aldrich) dissolved in 2 ml of de-ionized water were mixed with 100 ml of 16 ppg ZnBr$_2$/CaBr$_2$ brine (obtained by diluting 19.2 ppg ZnBr$_2$/CaBr$_2$ brine from MI-Swaco with de-ionized water). The mixture was placed in an oven at 150° F. for 24 hours, following which it was loaded on to a Grace M5600 rheometer and the viscosity of the fluid was measured at 100 s$^{-1}$ and 425° F. FIG. 4 shows that the viscosity of the fluid initially went down upon heating, but increased sharply after about 20 minutes of measurement.

Example 5

Figure 5:
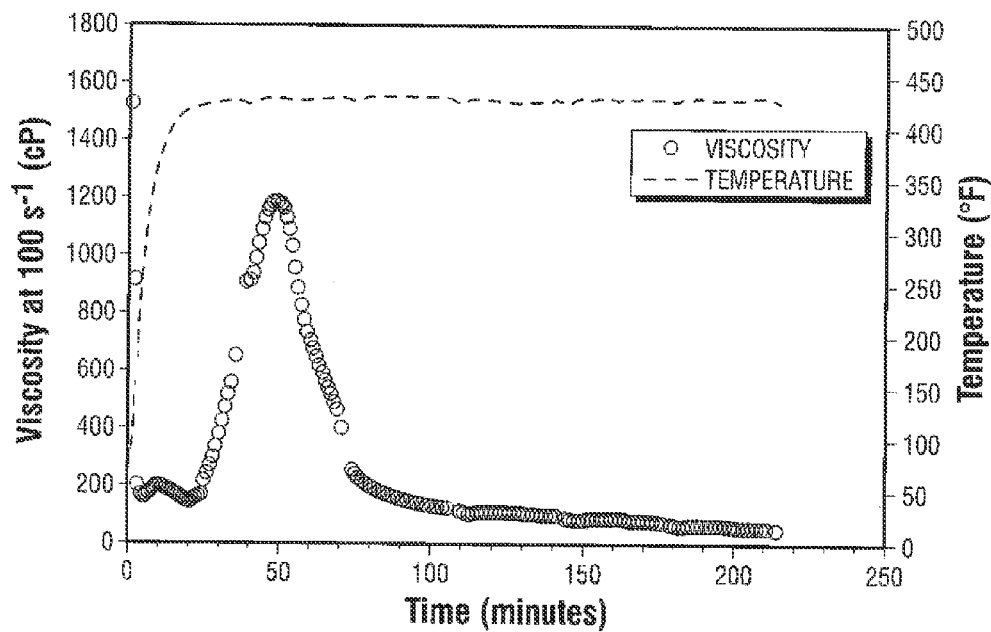
FIG. 5 is a plot of viscosity of a poly(HEA)-poly(HEMA)-$ZnBr_2$/$CaBr_2$ gel at 425° F.

High Temperature Viscosity of Poly(HEA)-Poly(HEMA)-ZnBr$_2$/CaBr$_2$ gel 0.01 g of 2,2-azobis(2-aminopropane) dihydrochloride (Sigma-Aldrich) was dissolved in 100 ml of 16 ppg ZnBr2/CaBr2 brine (obtained by diluting 19.2 ppg ZnBr$_2$/CaBr$_2$ brine from MI-Swaco with de-ionized water), followed by addition of 2 g 2-HEMA and 2 g 2-HEA. The mixture was placed in an oven at 150° F. for 24 hours, following which it was loaded on to a Grace M5600 rheometer and the viscosity of the fluid was measured at 100 s$^{-1}$ and 425° F. FIG. 5 shows that the viscosity of the fluid increased sharply after about 20 minutes of measurement. In this example, a copolymer of poly(HEMA) and poly(HEA) was likely formed. Note that in separate tests, it was observed that 2 g 2-HEMA and 2 g 2-HEA independently did not result in high viscosity gels, supporting the hypothesis that a copolymer was indeed formed in FIG. 5.

These examples show that different monomers/comonomers may be chosen in this manner to achieve secondary thickening after different times at temperature.

Since ZnBr$_2$/CaBr$_2$ brines are acidic (pH around 3 to 4), most polymers rapidly degrade in these brines at elevated temperatures. As a result, viscosification of these high density acidic brines is challenging. All the above examples demonstrate that polymers such as poly(HEMA) and poly(HEA) undergo secondary thickening in ZnBr$_2$/CaBr$_2$ brine in the absence of a deliberately added crosslinker. Other polymers that have similar solubility parameters may also be expected to be soluble in zinc bromide/calcium bromide brines and can consequently be used for placing gravel packs or proppant packs.

Example 6

High Temperature Solubility of Cellulose in ZnBr/CaBr$_2$ 0.17 g of cellulose (Celluflow C-25 from Chisso America) were added to 17 ml of 16 lbm/gal ZnBr$_2$/CaBr$_2$ brine and the mixture was heated in an oil bath to 200 deg F. The polymer dissolved in the brine and remained soluble when the temperature was decreased to 70 deg F. (ambient temperature). In another experiment, it was confirmed that Celluflow C-25 did not dissolve in water even upon heating to 200 deg F. This is another seemingly counter-intuitive example of a polymer that is soluble in an aqueous salt solution, but not soluble in water. However, this behavior can be rationalized in terms of solubility parameters. As mentioned earlier, solubility parameters for ZnBr2/CaBr2 brine are not well known. However, given that poly(2-HEMA) dissolves in this brine, polymers having solubility parameters similar to poly(2-HEMA) may be candidates for dissolution in this brine. Solubility parameters of cellophane (a cellulose product) are $\delta_D$=16.1, $\delta_P$=18.5, $\delta_H$=14.5 ("Hansen Solubility Parameters, a user Handbook", Charles Hansen, CRC Press, 2000). A comparison with the solubility parameters of poly(2-HEMA) [$\delta_D$=16.9, $\delta_P$=18.1, $\delta_H$=20.1, U.S. Pat. No. 7,256,242] shows that two out of the three parameters for the polymers are very close, indicating that cellulose may be a good candidate for dissolution in ZnBr2/CaBr2 brine. This example demonstrates that screening polymers based on solubility parameters can indeed identify polymers that are soluble in the brine of interest.

Other examples of polymers that could be used for the invention are polymers such as cellulose derivatives such as cellulose esters such as cellulose acetate, such as Eastman Cellulose Acetate (CA-398-30), cellulose propionate, cellulose butyrate and various cellulose acetate butyrates such as Eastman Cellulose Acetate Butyrate (CAB-171-15) or cellulose acetate propionates such as Eastman Cellulose Acetate Propionate (CAP-482-0.5). In order to define the optimum polymer composition for each brine, candidate polymers can be chosen by following the group contribution method mentioned earlier. Informed choices can be routinely performed by those of skill in the art by reviewing solubility parameters for polymers and or monomers, given the benefit of the disclosure.

Suitable copolymers can also be selected for the invention using the Hansen Solubility Parameters, by formulating polymer compositions including various comonomers, each "i" of them in a volume fraction $\Phi_i$ that are additive on total polymer volume. For a mixture of monomers, whose homopolymers have Hansen solubility parameters $\delta_P{}^P{}_i$, $\delta_H{}^P{}_i$, $\delta_D{}^P{}_i$, the copolymer solubility parameters $\delta_P{}^P$, $\delta_H{}^P$ and $\delta_D{}^P$ are as follows:

$$\delta_P{}^P = \Sigma \Phi_i \delta_P{}^P{}_i$$

$$\delta^{HP} = \Sigma \Phi_i \delta_H{}^P{}_i$$

$$\delta_D{}^P = \Sigma \Phi_i \delta_D{}^P{}_i$$

Sources of solubility parameters for homopolymers can be found in the literature. Included for reference Hansen Solubility Parameters a User's Handbook, Second Edition, Charles M. Hansen, CRC Press, 2007, Boca Raton, Fla.

Other polymer structural parameters, such as presence of acid or basic groups, presence of metal chelating groups, polymer molecular weight, number of positive or negative charges, presence of boron associating groups and others can be incorporated to the polymer aiming to specific functionalities. The suitability of a particular polymer structure to the application can be defined by performing simple laboratory experiments that are a routine undertaking for those of skill in the art of formulating oilfield fluids, given the benefit of this disclosure.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method for treating a subterranean formation, comprising:
   estimating the solubility parameter of a solvent;
   selecting a polymer based on the parameter;
   forming a fluid comprising a polymer precursor and the solvent; and
   introducing the fluid to the formation, wherein the formation is about 350° F. or warmer.

2. The method of claim 1, wherein the forming the fluid comprises introducing no crosslinker.

3. The method of claim 1, wherein the solvent is a brine.

4. The method of claim 3, wherein the brine has a density of 8.3 to 20 pounds/gal.

5. The method of claim 1, wherein the solvent comprises zinc bromide or calcium bromide or both.

6. The method of claim 1, wherein the polymer precursor comprises a polymer.

7. The method of claim 1, wherein the polymer precursor comprises a copolymer.

8. The method of claim 1, wherein the polymer precursor comprises a monomer.

9. The method of claim 1, wherein the polymer precursor comprises more than one monomer.

10. The method of claim 9, wherein the monomer is polymerized in the solvent.

11. The method of claim 9, wherein the monomer is polymerized before forming the fluid.

12. The method of claim 1, wherein the fluid has more viscosity than if no polymer precursor were in the fluid.

13. The method of claim 1, wherein the polymer precursor comprises monomers containing hydroxyalkyl, acrylate, and/or methacrylate groups.

14. The method of claim 1, wherein the polymer precursor comprises poly(2-hydroxyethyl methacrylate) and/or poly(2-hydroxyethyl acrylate).

15. The method of claim 1, wherein introducing the fluid comprises hydraulic fracturing and/or gravel packing.

16. The method of claim 1, wherein the polymer precursor comprises polymers whose Hildebrand solubility parameter $\delta_P$ is higher than 22 and lower than 42.

17. The method of claim 1, wherein the polymer precursor comprises polymers whose Hansen hydrogen bonding solubility parameter $\delta_H^P$ is higher than 22 and lower than 42.

18. The method of claim 1, wherein the polymer precursor comprises polymers whose Hansen hydrogen bonding solubility parameter $\delta_H^P$ is higher than 22 and lower than 42, and whose Hansen polar bonding solubility parameter $\delta_P^P$ is higher than 8 and lower than 22.

19. The method of claim 1, wherein the polymer precursor comprises polymers whose Hansen hydrogen bonding solubility parameter $\delta_H^P$ is higher than 22 and lower than 42, whose Hansen polar solubility parameter $\delta_P^P$ is higher than 8 and lower than 22, and whose Hansen dispersive solubility parameter $\delta_D^P$ is higher than 8 and lower than 22.

20. A method for treating a subterranean formation, comprising:
   estimating the solubility parameter of a solvent;
   selecting a polymer based on the parameter;
   forming a fluid comprising polymer and solvent,
   wherein the polymer comprises poly(2-hydroxyethyl methacrylate) and/or poly(2-hydroxyethyl acrylate, and
   wherein the solvent comprises zinc bromide or calcium bromide or both; and
   introducing the fluid to the formation, wherein the formation is about 350° F. or warmer.

21. A method for treating a subterranean formation, comprising:
   estimating the solubility parameter of a solvent;
   selecting a monomer polymer precursor based on the parameter;
   forming a fluid comprising monomer polymer precursor and solvent,
   wherein the polymer precursor comprises 2-hydroxyethyl methacrylate and/or 2-hydroxyethyl acrylate, and
   wherein the solvent comprises zinc bromide or calcium bromide or both; and
   introducing the fluid to the formation, wherein the formation is about 350° F. or warmer.

22. A method for treating a subterranean formation, comprising:
   estimating the solubility parameter of a solvent;
   selecting a monomer polymer precursor based on the parameter;
   forming a fluid comprising monomer polymer precursor and solvent, and
   introducing the fluid to the formation;
   wherein the polymer precursor is cellulose, and
   wherein the solvent comprises zinc bromide or calcium bromide or both; polymerizing the polymer precursor in the solvent.

23. A method for treating a subterranean formation, comprising:
   estimating the solubility parameter of a solvent;
   selecting a polymer based on the parameter;
   forming a fluid comprising a polymer precursor and the solvent; and
   introducing the fluid to the formation, wherein the formation is about 350° F. or warmer,
   wherein solubility parameter is a Hildebrand solubility parameter or a Hansen solubility parameter.

* * * * *